June 26, 1956
C. L. HEATER ET AL
2,751,857
SPRING BOLSTER TRUCK
Filed April 22, 1952
2 Sheets-Sheet 1
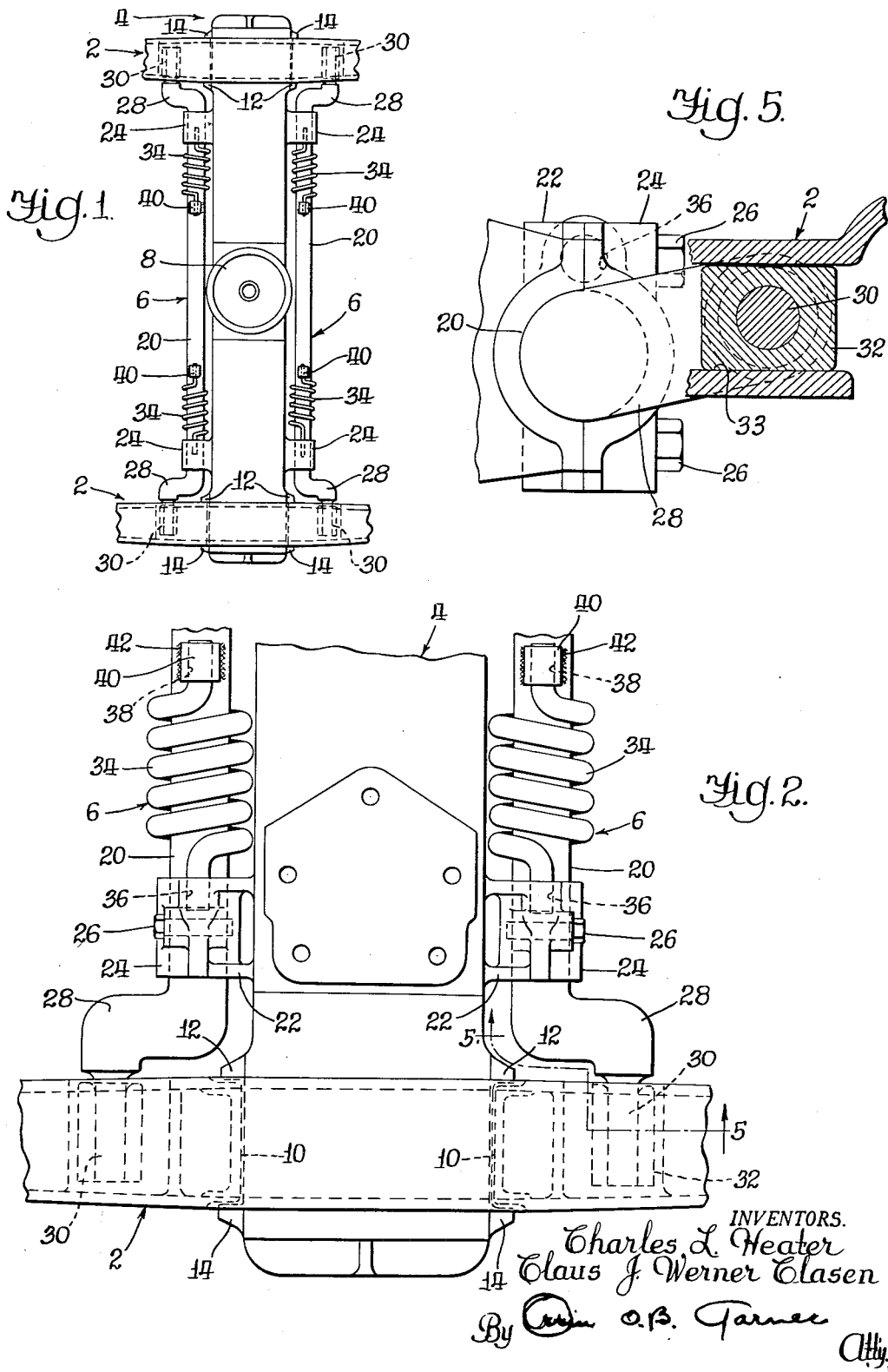
INVENTORS.
Charles L. Heater
Claus J. Werner Clasen
By O. B. Garner
Atty.

June 26, 1956

C. L. HEATER ET AL 2,751,857

SPRING BOLSTER TRUCK

Filed April 22, 1952

INVENTORS.
Charles L. Heater
Claus J. Werner Clasen
By Wm. O. B. Garner
Atty.

United States Patent Office 2,751,857
Patented June 26, 1956

2,751,857

SPRING BOLSTER TRUCK

Charles L. Heater and Claus J. Werner Clasen, Chicago, Ill., assignors to American Steel Foundries, Chicago, Ill., a corporation of New Jersey Application April 22, 1952, Serial No. 283,735

8 Claims. (Cl. 105—197)

This invention relates to railway car trucks and more particularly to a novel spring suspension for truck bolsters.

A primary object of the invention is to devise a bolster-supporting device which comprises spring means for resisting rotation of a shaft in response to torque forces imposed thereon by the load of the bolster, such an assembly being designated herein as a torsion spring assembly, whether the spring means are formed as part of the shaft or are separate therefrom, and whether the spring means are stressed in torsion, compression, tension, or any combination thereof.

A further object of the invention is to provide one or more shafts which support the bolster and are provided with crank or lever arms connected to the frame structure, spring means being provided for resisting rotation of the shaft in response to load imposed thereon by the bolster.

A more specific object of the invention is to provide one or more coil springs sleeved over the shaft and connected to the bolster and shaft for supporting the bolster.

Another object of the invention is to provide a torsion suspension arrangement for a bolster, wherein the ends of the torsion springs are journaled in receiving members, such as friction blocks, which are slidably positioned in slots defined by the side members of the truck, and the friction blocks frictionally engage the side members to dampen the vertical oscillation of the bolster supporting springs.

A further object of the invention is to adapt the above described bolster suspension to a spring-plankless freight car truck by providing flexible connections between the crank arms and the side frames of the truck which move relative to each other and to the bolster in service.

The foregoing and other objects and advantages of the invention will become apparent from a consideration of the following specification and the accompanying drawings, wherein:

Figure 1 is a fragmentary top plan view of a railway freight car truck embodying a preferred form of the invention;

Figure 2 is an enlarged fragmentary top plan view of the structure shown in Figure 1;

Figure 5 is a sectional view on the line 5—5 of Figure 2.

Figure 3:
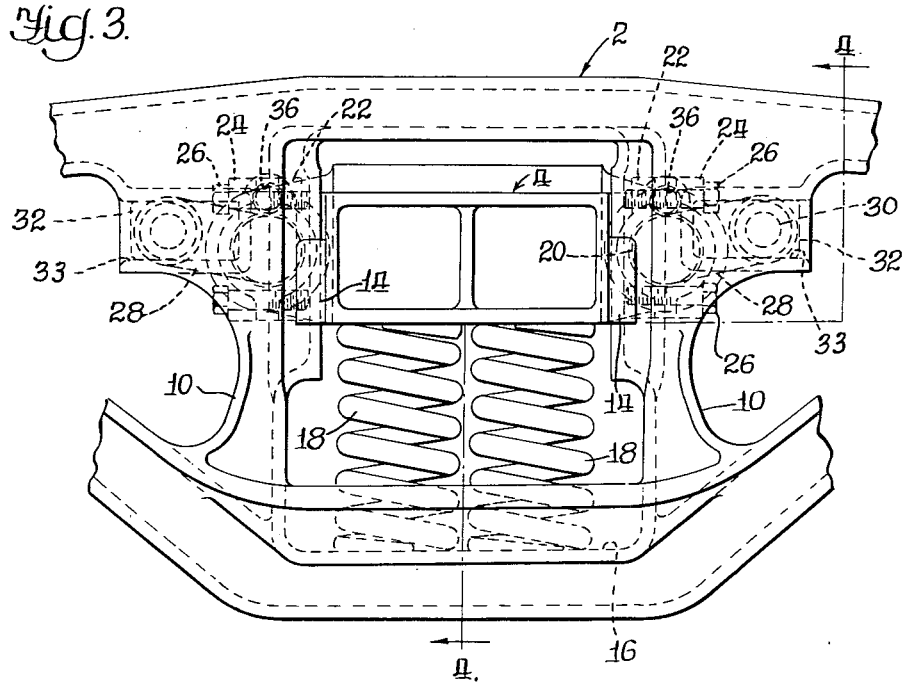
Figure 3 is a side elevational view of the structure shown in Figure 2.

Describing the invention in detail and referring first to Figure 1, the improved bolster suspension is illustrated as applied to a freight car truck having spaced side frames 2 and a bolster 4 affording a flexible connection therebetween in the usual manner. According to the invention, the bolster is resiliently supported by one or more torsion spring assemblies, generally designated 6, and is provided with a conventional center bearing 8, adapted to afford support for the body bolster (not shown) of a freight car. The ends of the frames 2 are provided with conventional journal means (not shown) for connection in the usual manner to wheel and axle assemblies (not shown) of the truck.

Referring to Figures 2 to 5, it will be seen that each end of the bolster is slidably interlocked with columns 10 of the related side frame 2 by inboard and outboard bolster gibs 12 and 14 adapted to accommodate vertical oscillation of the bolster and to accommodate limited movement of the side frames 2 relative to the bolster under service conditions, as, for example, when the truck proceeds around a curve in the track thereby causing the side frames and bolsters to move out-of-square with respect to each other as is well known in the art.

Figure 4:
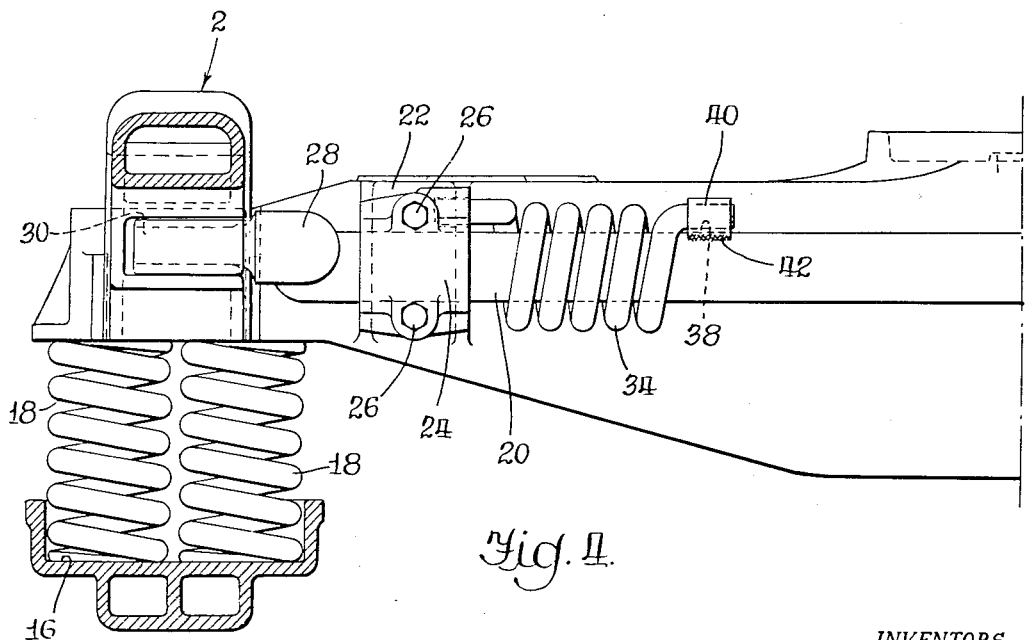
Figure 4 is a sectional view on the line 4—4 of Figure 3.

It may also be noted, as best seen in Figures 3 and 4, that each side frame is preferably provided with a spring seat 16 upon which may be supported a plurality of conventional truck springs 18 affording additional support for the bolster 4. It will be understood that, if desired, these springs 18 may be eliminated and also, if desired, the side frames 2 may be provided with rigid interconnections defining a frame structure such as is common in the passenger car truck art.

In the illustrated embodiment of the invention, a torsion spring assembly 6 is disposed at each side of the bolster and comprises a shaft 20 rotatably journaled adjacent each end thereof within a complementary opening of a bearing bracket 22, having a bearing cap 24 detachably secured thereto as by cap screws 26. Each end of the shaft 20 is provided with a crank arm 28 having a substantially cylindrical pivot or journal portion 30 approximately parallel to the shaft and received within a complementary opening of a cross head 32 which is slidably mounted for reciprocation within a substantially horizontal slot 33 of the adjacent side frame column 10, in frictional engagement therewith at the bottom of the slot. If such frictional engagement is not desired, a roller may be substituted for the cross head 32 thereby reducing the frictional action inherent in the disclosed embodiment it is desired to reduce. One or more coil springs 34 are sleeved over the shaft 20, one end of each spring being received within a complementary opening 36 defined by the adjacent bracket 22 and its bearing cap 24. The other end of the spring 34 is fitted within a complementary opening 38 of a bracket 40 secured in any convenient manner to the shaft 20, as by welding at 42.

Thus it will be understood that as the bolster 4 moves downwardly, the shafts 20 rotate on their crank arms 28 to stress the springs 34; and, under these conditions, the cross heads 32 associated with each side frame 2 move toward each other. As the bolster moves upwardly to release the springs 34, the shafts 20 rotate upwardly, and the cross heads 32 associated with each side frame 2 move away from each other. Additionally the frictional engagement of the cross head 32 with the bottom of the slot 33 serves as a built-in snubbing device to dampen all oscillations of the bolster supporting springs. Out-of-square movements and movements of the bolster 4 endwise thereof with respect to the side frames 2 are accommodated and frictionally resisted by sliding of the cross heads 32 within their slots 33 and are limited by the columns 10 and the gibs 12 and 14.

We claim:

1. A railway car truck comprising spaced side frames having slots therein, a movable bolster extending therebetween, a shaft having crank arms at the ends thereof, each of said arms having a pivot portion approximately parallel to said shaft, a cross head pivotally mounted on each pivot portion, said cross heads being positioned in the respective slots of said frames for substantial linear movement therein, and in slidable frictional engagement with the frame, said bolster having a bearing opening journally receiving said shaft, and spring means connected to the bolster and the shaft for resisting pivotal movement of the shaft under the load of the bolster.

2. A railway car truck, according to claim 1, wherein the spring means are characterized by a coil spring having its ends approximately parallel to the shaft, one of said ends being received within a complementary opening of the bolster and the other of said ends being anchored to the shaft.

3. A railway car truck comprising a frame structure defining slots therein, said slots having a common axis extending longitudinally of the truck, friction blocks slidably positioned in said slots and slidably engaging the frame in frictional engagement therewith, a bolster extending transversely of said structure, shafts at opposite sides of the bolster rotatably journaled within complementary openings thereof, crank arms on said shafts journaled in said friction blocks, and spring means connected to the shafts and bolster for resisting pivotal movement of the shafts under the load of the bolster.

4. A railway car truck, according to claim 3, wherein the spring means are characterized by springs sleeved on the shaft, each of said springs being anchored to the bolster and to the related shaft.

5. In a bolster suspension arrangement for a railway car truck, spaced side frames, a bolster extending therebetween and slidably interlocked therewith, horizontally arranged elongated slots in said frames, friction blocks slidably positioned in said slots in flat frictional engagement with said frames at the bottom of said slots, a pair of shafts disposed on opposite sides of said bolster and rotatably carried thereby, crank arms on the ends of said shafts, said crank arms being journally carried by said friction blocks, and a pair of torsion springs sleeved on each of said shafts adjacent the ends thereof, each of said springs having one end secured to the related shaft and the other end secured to said bolster.

6. A supporting arrangement comprising a supporting structure having slots therein, friction blocks slidably positioned in said slots for linear movement therein, a shaft having substantial coaxial eccentric portions rotatably journaled in said blocks for slidable movement lengthwise of said supporting structure and for rotatable movement relative to said structure, a transverse member supported by said structure and having an opening journally receiving said shaft, and a torsion spring having one end connected to said shaft and the other end connected to said transverse member for supporting the load thereof.

7. In a railway car truck, a bolster, spaced side frames, said frames defining elongated openings therein, receiving members movably positioned in said openings in engagement with said frames, a plurality of shafts extending transversely between said frames and being rotatably connected to said bolster at opposite sides thereof, pivot ends on said shafts, said pivot ends being rotatably carried by respective receiving members, and a plurality of torsion springs sleeved on said shafts, each of said springs having one end connected to the shaft associated therewith and the other end connected to said bolster, to yieldingly bias the bolster to level position transversely and longitudinally of the truck.

8. A railway car truck comprising a frame structure, a bolster extending transversely thereof, generally horizontal slots in said frame structure, members positioned in said slots in direct slidable frictional engagement with the frame structure for movement therein lengthwise of the structure, shafts at opposite sides of the bolster rotatably journaled within complementary openings thereof, crank arms on said shafts journaled in said members, and spring means connected to the shafts and bolster for resisting movement of the shafts under the load of the bolster.

References Cited in the file of this patent

UNITED STATES PATENTS

| | | |
|---|---|---|
| 41,404 | Taber | Jan. 26, 1864 |
| 376,614 | Sullivan | Jan. 17, 1888 |
| 2,268,439 | Beebe | Dec. 30, 1941 |
| 2,283,971 | Chambers | May 26, 1942 |
| 2,410,068 | Hickman | Oct. 29, 1946 |
| 2,426,513 | Linn | Aug. 26, 1947 |
| 2,609,212 | McMurtrie | Sept. 2, 1952 |